UNITED STATES PATENT OFFICE 2,654,714

PROCESS OF BREAKING PETROLEUM EMULSIONS AND COMPOSITIONS THEREFOR

Willard H. Kirkpatrick, Sugar Land, Tex., assignor to Visco Products Company, Sugar Land, Tex., a corporation of Delaware No Drawing. Application November 16, 1950, Serial No. 196,084

12 Claims. (Cl. 252—332)

This invention relates in particular to the treatment of emulsions of mineral oil and water, such as petroleum emulsions commonly encountered in the production, handling and refining of crude mineral oil for the purpose of separating the oil from the water. Also, the invention relates to the treatment of other water-in-oil type of emulsions wherein the emulsions are produced artifically or naturally and the resolution of the emulsions presents a problem of recovery or disposal.

Petroleum emulsions are in general of the water-in-oil type wherein the oil acts as a continuous phase for the dispersal of finely divided particles of naturally occurring waters or brines. These emulsions are often extremely stable and will not resolve on long standing. It is to be understood that water-in-oil emulsions may occur artifically resulting from any one or more of numerous operations encountered in various industries. The emulsions obtained from producing wells and from the bottom of crude oil storage tanks are commonly referred to as "cut oil," "emulsified oil," "bottom settlings," and "B. S."

One type of process involves subjecting an emulsion of the water-in-oil type to the action of a demulsifying agent of the kind hereinafter described, thereby causing the emulsion to resolve and stratify into its component parts of oil and water or brine after the emulsion has been allowed to stand in a relatively quiescent state.

Another type of process involves the use of a demulsifying agent of the kind hereinafter described in acidizing operations on petroleum producing strata. In such an operation corrosion inhibited acid is forced down the well and into the formation under pressure. The acid attacks limestone formation enlarging the fissures and openings through which the oil fluids flow to the well pool, thus increasing the production. In many cases, particularly troublesome emulsions are encountered immediately after a well has been acidized. This condition can be minimized and many times eliminated by incorporating a suitable demulsifying composition with the acidizing medium.

Still another type of process involves the use of a demulsifying agent of the kind hereinafter described in refinery desalting operations. In the refining of many crude oils a desalting operation is necessary in order to prevent the accumulation of large deposits of salt in the stills and to prevent corrosion resulting from the decomposition of such salts under high still temperatures. In a typical desalting installation 5% to 10% of fresh water is added to the crude oil charge stock and emulsified therein by means of a pump or through a differential pressure valve. A demulsifying agent is added and the treated oil permitted to stand in a quiescent state for relatively short periods of time allowing the salt-laden water to stratify, whereupon it is bled off to waste resulting in 90% to 98% removal of salt content. This operation is carried out continuously as contrasted with batch treating.

One object of my invention is to provide a novel and economical process for resolving emulsions of the character referred to into their component parts of oil and water or brine.

Another object is to provide a novel reagent which is water-wettable, interfacial and surface-active in order to enable its use as a demulsifier or for such uses where surface-active characteristics are necessary or desirable.

The treating agents employed in accordance with the present invention consist of compositions of high molecular weight which are inorganic esters of polyoxyalkylene compounds having a terminal hydroxy group in which the major proportion of the molecular weight is attributable to oxypropylene groups (e. g., oxy 1,2-propylene) or to mixed oxyethylene and oxypropylene groups in which the weight ratio of oxyethylene to oxypropylene does not exceed 4:1. Where the oxyalkylene groups consist of oxyethylene and oxypropylene groups, the minimum molecular weight should be at least 1000. Where the oxyalkylene groups consist solely of oxypropylene groups, the minimum molecular weight should be at least 1200 and preferably at least 2000. With the foregoing limitations the molecular weights of the compounds employed for the purpose of the invention are preferably within the range of 1500 to 7500.

It has been discovered that these compositions have unusual and unexpected properties for resolving water-in-oil emulsions into their component parts. One possible theory which may be postulated for the striking effectiveness of these compositions in resolving petroleum emulsions is a hydrophobehydrophile balance which has not been secured heretofore with compositions well known in this art.

The preparation of polyoxyalkylene diols which may be employed as starting materials for the preparation of the corresponding esters has been described in U. S. Patent 2,425,845. This patent describes the preparation of polyoxyalkylene diols prepared from the reaction of ethylene oxide, 1,2-propylene oxide and an aliphatic dihydroxy alcohol. The resulting heteric diols possess viscosity relationships, solubility relationships and fusion temperature relationships entirely unlike those expected, based on comparisons with polyoxyethylene glycols on the one hand and polyoxypropylene glycols on the other. For example, polyoxyethylene glycols of an average molecular weight of about 600 to 800 have the consistency of a semi-fluid, pasty mass. Below this range, the products are clear, normally liquid compositions which are miscible with water in all proportions. At and above the average molecular weight of 800 to 900 the polyoxyethylene glycols are low melting, normally solid compositions having a fusion temperature which increases with increased molecular weights from about 30 degrees C. to a maximum of approximately 60 degrees C. to 65 degrees C. These solid products are miscible with water in all proportions. Polyoxypropylene compounds are known and available in molecular weights up to 3000. However, the addition products resulting from the reaction of 1,2-propylene oxide with water are referred to in the literature but the properties are not described in a manner which would permit identification of the product. Monoethers of polyoxypropylene glycols have been described in U. S. Patent 2,448,664 and these compounds, unlike similar polyoxyethylene compounds are immiscible with water and are miscible with paraffinic hydrocarbons, the extent of miscibility being determined by temperature and nature of the ether grouping. The monoethers of polyoxypropylene glycol have unusual temperature-viscosity relationships in that while they retain adequate body at elevated temperatures they do not become unusually viscous at low temperatures. It is significant that these products having molecular weights of 2,000 to 3,000 are liquids whereas the corresponding polyoxyethylene compounds are solids.

The compositions of this invention wherein oxyethylene and oxypropylene groupings are present in a random or alternate sequence possess characteristics which cannot be secured by a simple blending of polyoxyethylene compounds with polyoxypropylene compounds. It is possible within such a given molecule to secure a molecular weight from 3,000 to 20,000 where the product remains liquid at normally prevailing temperatures. Such products are miscible in water and in oils. However, the water solubility decreases as the temperature is raised and at higher temperatures two-phase systems result. These characteristics are unusual and striking and would not be anticipated by careful consideration of the characteristics of polyoxyethylene glycols and polyoxypropylene glycols.

All of the compounds employed for the purpose of this invention are characterized by the nucleus

—$(OS_nH_{2n})_x$— wherein $n$ has a value of 3, or both 2 and 3 in a ratio such that the weight ratio of oxyethylene to oxypropylene does not exceed 4 to 1, and a major proportion, preferably at least 60% by weight of the compound, is attributable to this nucleus.

As a further classification and specific illustration of compositions which are adapted for use in this invention, there can be mentioned the monoesters of polyoxyalkylene diols and inorganic acids, the diesters of polyoxyalkylene diols and inorganic acids, the monoesters of polyoxyalkylene diol monoethers and inorganic acids, the monoesters of heteric polyoxyalkylene diols and inorganic acids, the diesters of heteric polyoxyalkylene diols and inorganic acids, and the monoesters of heteric polyoxyalkylene diol monoethers and inorganic acids.

The inorganic monoesters and polyesters of the polyoxyalkylene diols as well as the esters of the polyoxyalkylene diol monoethers may be prepared in any suitable manner by reacting the diol or the diol monoether with an inorganic acid or acid anhydride. In order to form esters the inorganic acid or acid anhydride must be an oxygen containing acid or acid anhydride, as, for example, the acids of phosphorous, sulfur, boron, arsenic and the corresponding anhydrides including, for example, orthophosphoric acid, metaphosphoric acid, pyrophosphoric acid, polymetaphosphoric acids, hypophosphoric acid, orthophosphoric acid, alkylphosphoric acids, e. g., ethyl phosphoric acid, orthoboric acid, tetraboric acid, otho-, pyro- and metaarsenic acid, sulfuric acid and the anhydrides which form such acids with the addition of water. Free acidic groups of the resultant esters may be allowed to remain as such or they may be further reacted with alkalis, alcohols and amines to yield inorganic salts (e. g., sodium, potassium, ammonium), esters (e. g., methyl, ethyl, propyl, butyl and homologous derivatives), amine salts and amides, the amine salts being formed, for example, by reaction with alkyl, alkenyl, aralkyl, aralkenyl, aryl and/or cyclo amines, such as ethyl amine, mono-, di- and triethanol amine, ethylenediamine, propylenediamine, diethylenetriamine, dipropylenetriamine, triethylenetetramine, isopropylamine, butylamine,, amylamine, cyclohexylamine, aniline, anisidine, toluidine and benzylamine.

It is not intended that the foregoing lists each and every polyoxyalkylene diol inorganic ester composition that will satisfactorily resolve water-in-oil emulsions in accordance with this invention, for it will be obvious to those skilled in the art that certain mixed derivatives would function satisfactorily and in fact are contemplated by the present invention.

The simplest manner of preparing a monoester and diester is by reacting the diol with the required acid anhydride. In many instances the reaction will proceed without the application of external heat. For the purpose of this invention the presence of a small quantity of residual free acid is not harmful to the resulting demulsifier. In those instances where acid anhydrides are not readily available or if it is desired that the reaction product contain no free acid the diol or monoether may be reacted with the required acid in the presence of a solvent which lends itself to azeotropic distillation. The reaction mass is then heated at elevated temperatures until the theoretical amount of water has been secured to indicate substantial esterification. Both symmetrical and unsymmetrical diesters can be prepared with this procedure and the resulting compositions are effective in demulsifying water-in-oil emulsions.

Since as indicated above it is possible to prepare the compositions of this invention by various routes and from a number of different classes of starting materials the invention should not be limited by the following examples which are merely intended to illustrate some satisfactory procedures for preparing a few of the materials suitable for employment within the scope of the present invention.

EXAMPLE I

In a suitable reaction vessel provided with means of agitation, heating and removal of aqueous distillate with simultaneous return of azeotropic distillate to the reaction mass, there is added 140 parts of Ucon LB-625, 50 parts of a suitable hydrocarbon fraction such as $SO_2$ extract and 6.2 parts of boric acid. Ucon LB-625 is the monobutyl ether of a polyoxypropylene glycol, whose molecular weight is approximately 1500. The materials are heated for 90 minutes with agitation and the temperature allowed to reach 190 degrees C. At this point only 0.6 part of an aqueous distillate has been secured. An additional 50 parts of $SO_2$ extract added and the temperature raised to a maximum of 195 degrees C. with the removal of 1 part of aqueous distillate during this operation. After the reaction mass has cooled to approximately 135 degrees C., 150 parts of $SO_2$ extract are added with stirring to yield the finished product.

EXAMPLE II

In a reaction vessel containing 1190 parts of Ucon 50-HB-660, 60 parts of anhydrous sulfur trioxide was added with stirring over a 30 minute period. Ucon 50-HB-660 is a monobutyl ether of a heteric polyoxyalkylene glycol, the polyoxyalkylene chain of which contains ethylene oxide and propylene oxide in a 1 to 1 ratio, and the molecular weight of the monoether is approximately 1700. The reaction mass was gradually heated to 60 degrees C. and maintained at that temperature for 2 hours. The mass was cooled and several portions were neutralized as indicated below:

A. Two hundred and fifty (250) parts of the above acid intermediate was neutralized to methyl orange end point with 16.4 parts of ammonium hydroxide.

B. Two hundred and fifty (250) parts of the acid intermediate was neutralized to methyl orange end point with 14.1 parts of n-butylamine.

C. Five hundred (500) parts of the acid intermediate was neutralized with a mixture of 14.1 parts of n-butylamine and 16.1 parts of ammonia.

D. Two hundred and thirty-two (232) parts of the acid intermediate was neutralized with 21.9 parts of commercial triethanolamine.

EXAMPLE III

In a suitable reaction vessel containing 1000 parts of Ucon 50-HB-660 and 2 parts aluminum chloride as a catalyst there was added gradually with stirring 15.3 parts of phosphorus oxychloride. After the addition was completed the mass was heated for 8 hours, gradually raising the temperature of 123 degrees C. Up to this point no evolution of hydrochloric acid gas is observed. The temperature was gradually increased and the mass heated for 8 hours at a temperature between 150 degrees C. and 188 degrees C. with some hydrochloric acid gas observed. The reaction mass was permitted to stand over night and was again heated to 180 degrees C. to 185 degrees C. for 1 hour which caused a quite copious evolution of hydrochloric acid gas. The mass was then cooled to 60 degrees C. and neutralized with 12 parts of n-butylamine.

EXAMPLE IV

In a suitable reaction vessel containing 1500 parts of Ucon 50-HB-5100, there was added at room temperature 5 parts of phosphorus pentoxide without evidence of any reaction. Ucon 50-HB-5100 is a monobutyl ether of a heteric polyoxyalkylene glycol, the polyoxyalkylene chain of which contains ethylene oxide and propylene oxide in a 1 to 1 ratio and the molecular weight of the monoether is approximately 5000. The mixture was heated to 150 degrees C. with stirring and the phosphorus pentoxide began to react as indicated by gradual solution. At 180 degrees C. the reaction was complete as indicated by the disappearance of phosphorus pentoxide. The mass was cooled to 120 degrees C. and 2.1 parts of phosphorus pentoxide was added. The temperature was gradually raised to 200 degrees C. and held for 1 hour at this point. The product was not neutralized with any alkaline material but was retained in its acidic state.

EXAMPLE V

In a suitable reaction vessel containing 1000 parts of Ucon 50-HB-5100, there was added 7.1 parts of phosphorus pentoxide at a temperature of 80 degrees C. The mixture was heated with agitation to 175 degrees C. and held at this point for 1 hour. The acidic composition was divided in 2 portions and 1 was retained as the acid compound. The other portion, consisting of 500 parts, was neutralized to methyl orange neutrality with 5 parts of n-butylamine.

EXAMPLE VI

In a suitable reaction vessel containing 1020 parts of Ucon 50-HB-660, there was added gradually with stirring 16.9 parts of tetraphosphoric acid. The reaction mixture was heated to 150 degrees C. for 1 hour. At the end of this time a portion of the sample was retained as such and 500 parts of the acid material was neutralized with 4 parts n-butylamine.

EXAMPLE VII

In a suitable reaction vessel containing 680 parts of Ucon 50-HB-660, there was added gradually with stirring 16.9 parts of tetraphosphoric acid. The reaction mixture was heated to 150 degrees C. for 1 hour. At the end of this time a portion of the sample was retained as such and 500 parts of the acid material was neutralized with 4 parts n-butylamine.

EXAMPLE VIII

In a suitable reaction vessel containing 300 parts of a polyoxypropylene glycol having a molecular weight of 2000, there was added 3.1 parts of boric acid and 50 parts of a suitable hydrocarbon fraction such as $SO_2$ extract. The reaction mixture was heated with stirring and at 182 degrees C. an aqueous distillate began to form. After 4 hours heating and a maximum temperature of 273 degrees C., a total of 4.2 parts of aqueous distillate had been secured. The reaction mass was allowed to cool and approximately 400 parts of $SO_2$ extract added to yield the finished product.

By way of illustrating the remarkable effectiveness of the products contemplated by this invention, the method of testing their efficiency will be described and exemplary data given.

Test I

| | |
|---|---|
| State of | Texas. |
| Oil field | Hastings. |
| Oil company | Stanolind Oil & Gas. |
| Lease | Shyrock. |
| Well | No. 1 |

Test I—Continued

| | |
|---|---|
| Per cent emulsion in fluid from the well | 100. |
| Per cent water in the fluid from the well | 10. |
| Per cent water obtained by complete demulsification | 28. |
| Temperature of test | 140 degrees F. |
| Manual agitation | 240 cold shakes, 75 hot shakes. |
| Treating ratio | 1/20000. |

One hundred (100) cc. samples of the emulsion were taken and placed in conventional field test bottles. Various treating chemicals were added to the bottles at a ratio of 1 part chemical to 20,000 parts emulsion fluid. After the test chemical was added the samples which were placed in the test bottles were shaken 200 times at atmospheric temperature and subsequently agitated an additional 75 times at a treating temperature of 140 degrees F. After shaking in each instance the water drop was determined and recorded, that is to say the amount of water which separated from the emulsion. The color of the oil was also observed and recorded at the same time. After agitation at elevated temperature the samples were maintained at 140 degrees F. for a total of 20 minutes to permit settling and stratification of the water.

The emulsion sample was secured just after the oil came from the well and every effort was made to maintain conditions comparable to those present in the full scale plant treatment. After agitation the samples were allowed to settle and were tested for water drop at predetermined periods of time and recorded on suitable test sheets. The test showed that the compositions as prepared in accordance with the instructions of Examples III, IV, V and VI released approximately 100% of the contained water after cold agitation. After the bottles had reached treating temperature of 140 degrees F. these compositions had completely dropped the contained water after 20 minutes, and the color of the oil was excellent. The treated oil contained no residual emulsion which demonstrated that the crude oil emulsion had been satisfactorily resolved by the compositions of this invention.

Test II

| | |
|---|---|
| State of | Texas. |
| Oil field | Thompson. |
| Oil company | H. M. Naylor. |
| Lease | Gehr. |
| Well | No. 9. |
| Per cent emulsion in fluid from the well | 100. |
| Per cent water in the fluid from the well | 8. |
| Per cent water obtained by complete demulsification | 60. |
| Temperature of test | Atmospheric. |
| Manual agitation | 250 shakes. |
| Treating ratio | 1/15000. |

With the procedure similar to that described in Test I without the application of external heat, tests were made with the composition as prepared in Example I. After standing 15 minutes, 30 parts of the contained water had stratified. The residual water or a total of 60 parts had stratified after 45 minutes settling time. The oil had a brilliant sheen and met pipeline specifications.

The test indicated that the composition satisfactorily resolved the crude oil emulsion.

In the previous description, frequent reference has been made to heteric polyoxyalkylene diols and by the word "heteric" is meant that the diol constituents of the mixture vary in internal configuration from molecule to molecule, such variations arising out of a randomness of the distribution of the oxyethylene and the oxypropylene groups therein, as results, for instance, from the concurrent reaction of the ethylene oxide and the propylene oxide on the starting material and the intermediate products.

Throughout the specification and claims the following definitions apply:

Alkyl—a monovalent radical derived from an aliphatic hydrocarbon by removal of one hydrogen atom, as, for example, methyl, ethyl, propyl, octyl, cetyl, myricyl and their homologues, preferably containing 1 to 30 carbon atoms;

Alkenyl—a monovalent radical derived from an unsaturated aliphatic hydrocarbon, as, for example, ethenyl (vinyl), allyl, undecenyl, octadecenyl, linolenyl, and their homologues, preferably containing 2 to 18 carbon atoms and having a single double bond;

Aralkyl—a monovalent radical derived from an aromatic substituted aliphatic hydrocarbon, as, for example, benzyl, phenylethyl, phenylpropyl, phenylbutyl, phenyloctyl, phenylcetyl, phenyloctadecyl and homologues, preferably containing 1 to 30 carbon atoms in the alkyl chain;

Cycloalkyl—a monovalent radical derived from a cycloaliphatic hydrocarbon, as, for example, cyclopentyl, cyclohexyl and cycloheptyl;

Aralkenyl—a monovalent radical derived from an aromatic substituted unsaturated aliphatic hydrocarbon, as, for example, styryl, cinnamyl, and homologues;

Aryl—a monovalent radical derived from an aromatic hydrocarbon by removal of one hydrogen atom, as, for example, phenyl and naphthyl;

The demulsifying compositions are preferably employed in the proportion of 1 part of reagent to from 2000 to 50,000 parts of emulsion either by adding the concentrated product direct to the emulsion or after diluting with a suitable vehicle in the customary manner.

The suitable hydrocarbon vehicle referred to in the examples is sulfur dioxide ($SO_2$) extract. This material is a by-product from the Edeleanu process of refining petroleum in which the undesirable fractions are removed by extraction with liquid sulfur dioxide. After removal of the sulfur dioxide a mixture of hydrocarbons, substantially aromatic in character, remains which is designated in the trade as $SO_2$ extract. Examples of other suitable hydrocarbon vehicles are Gray Tower polymers, toluene, xylene, gas oil, diesel fuel, Bunker fuel and coal tar solvents. The above cited exampels of solvents are adaptable to azeotropic distillation as would also be any other solvent which is immiscible with water, miscible with the reacting mass and has a boiling point or boiling range in excess of the boiling point of water.

The products prepared in accordance with the invention are very useful in breaking petroleum emulsions, especially those in which the oil is paraffinic or paraffinic-naphthenic, and have been successfully used in breaking water-in-oil petroleum emulsions in the Mid-Continent oil fields, including Oklahoma, Illinois, Kansas, the gulf coast, Louisiana, southwest Texas and California.

This application is a continuation-in-part of copending application, Serial No. 99,333, filed June 15, 1949.

Certain of the compositions disclosed herein are claimed as new compositions of matter in my copending application Serial No. 336,875 filed February 13, 1953.

The invention is hereby claimed as follows:

1. A process of breaking water-in-oil emulsions which comprises treating such emulsions with an inorganic ester of an oxygen containing inorganic acid and an aliphatic polyoxyalkylene compound having a terminal hydroxy group in which the major proportion of the average molecular weight is attributable to oxyalkylene groups from the group consisting of oxypropylene groups and mixed oxyethylene and oxypropylene groups having a weight ratio of oxyethylene to oxypropylene not exceeding 4:1 and the average molecular weight is at least 1000 where the oxyalkylene groups are both oxyethylene and oxypropylene and at least 1200 where the oxyalkylene groups are solely oxypropylene groups.

2. A process of breaking water-in-oil emulsions which comprises treating such emulsions with an inorganic ester of an oxygen containing inorganic acid and an aliphatic polyoxyalkylene compound having a terminal hydroxy group in which the major proportion of the average molecular weight is attributable to oxyalkylene groups from the class consisting of oxypropylene groups and mixed oxyethylene and oxypropylene groups having a weight ratio of oxyethylene to oxypropylene not exceeding 4:1 and the average molecular weight is within the range of 1500 to 7500.

3. A process of breaking water-in-oil emulsions which comprises treating such emulsions with an inorganic ester of an oxygen containing inorganic acid and an aliphatic polyoxyalkylene diol having an average molecular weight of at least 1000 and characterized by a molecular structure in which the oxyalkylene groups are mixed oxyethylene and oxypropylene groups in a weight ratio of oxyethylene to oxypropylene not exceeding 4:1.

4. A process of breaking water-in-oil emulsions which comprises treating such emulsions with an inorganic ester of an oxygen containing inorganic acid and an aliphatic polyoxyalkylene diol having an average molecular weight of at least 2000 and characterized by a molecular structure in which the oxyalkylene groups consist solely of oxypropylene groups.

5. A process of breaking water-in-oil emulsions which comprises treating such emulsions with an inorganic ester of an oxygen containing inorganic acid and an aliphatic monohydroxy oxyethylene oxy 1,2-propylene monoether composition having an average molecular weight in excess of 1000 and characterized by a molecular structure composed principally of oxyethylene and oxypropylene groups, the weight ratio of oxyethylene to oxypropylene groups not exceeding 4:1.

6. A process of breaking water-in-oil emulsions which comprises treating such emulsions with an inorganic ester of an oxygen containing inorganic acid and an aliphatic polyoxyalkylene diol having an average molecular weight within the range of 1500 to 7500 and characterized by a molecular structure in which the oxyalkylene groups are mixed oxyethylene and oxypropylene groups in a weight ratio of oxyethylene to oxypropylene not exceeding 4:1.

7. A process of breaking water-in-oil emulsions which comprises treating such emulsions with an inorganic ester of an oxygen containing inorganic acid and an aliphatic polyoxyalkylene diol having an average molecular weight within the range of 1500 to 7500 and characterized by a molecular structure in which the oxyalkylene groups consist solely of oxy 1,2-propylene groups.

8. A process of breaking water-in-oil emulsions which comprises treating such emulsions with an inorganic ester of an oxygen containing inorganic acid and an aliphatic monohydroxy oxyethylene oxy 1,2-propylene monoether composition having an average molecular weight within the range of 1500 to 7500 and characterized by a molecular structure composed principally of oxyethylene and oxypropylene groups, the weight ratio of oxyethylene to oxypropylene groups not exceeding 4:1.

9. A process of breaking water-in-oil emulsions which comprises treating such emulsions with an inorganic ester of an oxygen containing inorganic acid and an aliphatic polyoxyalkylene compound having a terminal hydroxy group in which the major proportion of the average molecular weight is attributable to oxyalkylene groups from the group consisting of oxypropylene groups and mixed oxyethylene and oxypropylene groups having a weight ratio of oxyethylene to oxypropylene not exceeding 4:1 and the average molecular weight is at least 1000 where the oxyalkylene groups are both oxyethylene and oxypropylene and at least 1200 where the oxyalkylene groups are solely oxypropylene groups, said ester being at least partially neutralized with an amine.

10. A process of breaking water-in-oil emulsions which comprises treating such emulsions with an inorganic ester of an oxygen containing inorganic acid and an aliphatic polyoxyalkylene compound having a terminal hydroxy group in which the major proportion of the average molecular weight is attributable to oxyalkylene groups from the group consisting of oxypropylene groups and mixed oxyethylene and oxypropylene groups having a weight ratio of oxyethylene to oxypropylene not exceeding 4:1 and the average molecular weight is at least 1000 where the oxyalkylene groups are both oxyethylene and oxypropylene and at least 1200 where the oxyalkylene groups are solely oxypropylene groups, said ester being at least partially neutralized with ammonia.

11. A process of breaking water-in-oil emulsions which comprises treating such emulsions with an inorganic ester of an oxygen containing inorganic acid and a polyoxyalkylene compound having a terminal hydroxy group in which the major proportion of the average molecular weight is attributable to oxyalkylene groups from the group consisting of oxypropylene groups and mixed oxyethylene and oxypropylene groups having a weight ratio of oxyethylene to oxypropylene not exceeding 4:1 and the average molecular weight is at least 1000 where the oxyalkylene groups are both oxyethylene and oxypropylene and at least 1200 where the oxyalkylene groups are solely oxypropylene groups, said ester being at least partly neutralized with n-butylamine.

12. A process of breaking water-in-oil emulsions which comprises treating such emulsions with an inorganic ester of an oxygen containing inorganic acid and a polyoxyalkylene compound having a terminal hydroxy group in which the major proportion of the average molecular weight is attributable to oxyalkylene groups from the group consisting of oxypropylene groups and mixed oxyethylene and oxypropylene groups having a weight ratio of oxythylene to oxypropylene not exceeding 4:1 and the average molecular weight is at least 1000 where the oxyalkylene groups are both oxyethylene and oxypropylene and at least 1200 where the oxyalkylene groups are solely oxypropylene groups, said ester being at least partly neutralized with triethanolamine.

WILLARD H. KIRKPATRICK.

References Cited in the file of this patent

UNITED STATES PATENTS

| Number | Name | Date |
|---|---|---|
| 2,174,761 | Schuette et al. | Oct. 3, 1939 |
| 2,372,255 | De Groote et al. | Mar. 27, 1945 |
| 2,454,542 | Bock et al. | Nov. 23, 1948 |
| 2,454,543 | Bock et al. | Nov. 23, 1948 |
| 2,562,878 | Blair | Aug. 7, 1951 |

---

Certificate of Correction

Patent No. 2,654,714                          October 6, 1953

Willard H. Kirkpatrick

It is hereby certified that error appears in the printed specification of the above numbered patent requiring correction as follows:

Column 3, line 63, for "$-(OS_nH_{2n})_x-$" read $-(OC_nH_{2n})_x-$; column 4, line 22, for "otho-" read *ortho-*; column 7, line 10, for "240" read *200*; column 11, line 2, for "oxythylene" read *oxyethylene*;

and that the said Letters Patent should be read as corrected above, so that the same may conform to the record of the case in the Patent Office.

Signed and sealed this 1st day of December, A. D. 1953.

[SEAL]

ARTHUR W. CROCKER,
*Assistant Commissioner of Patents.*